(12) United States Patent  
Miyazaki et al.

(10) Patent No.: US 9,377,770 B2  
(45) Date of Patent: Jun. 28, 2016

(54) NUMERICAL CONTROL SYSTEM USING I/O UNIT FOR TIME MEASUREMENT

(71) Applicant: FANUC Corporation, Minamitsuru-gun, Yamanashi (JP)

(72) Inventors: Yoshito Miyazaki, Minamitsuru-gun (JP); Hiroshige Ando, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 747 days.

(21) Appl. No.: 13/761,310

(22) Filed: Feb. 7, 2013

(65) Prior Publication Data

US 2013/0245788 A1 Sep. 19, 2013

(30) Foreign Application Priority Data

Mar. 19, 2012 (JP) ................................. 2012-062101

(51) Int. Cl.  
*G05B 19/18* (2006.01)  
*G05B 19/414* (2006.01)

(52) U.S. Cl.  
CPC .............. *G05B 19/18* (2013.01); *G05B 19/414* (2013.01); *G05B 2219/34413* (2013.01)

(58) Field of Classification Search  
CPC ................. G05B 19/18; G05B 19/414; G05B 2219/34413  
See application file for complete search history.

(56) References Cited

U.S. PATENT DOCUMENTS

| | | | | | |
|---|---|---|---|---|---|
| 5,014,185 A | * | 5/1991 | Saito | ................... | G05D 23/1917 700/83 |
| 5,361,260 A | * | 11/1994 | Mito | ....................... | H04L 29/06 318/41 |
| 6,157,689 A | * | 12/2000 | Petty | ................... | H04L 25/0262 375/222 |
| 6,625,498 B1 | * | 9/2003 | Kurakake | ........... | G05B 19/0421 700/19 |
| 6,647,301 B1 | * | 11/2003 | Sederlund | .......... | G05B 19/0428 700/108 |
| 7,119,505 B2 | * | 10/2006 | Komaki | ............... | G05B 19/408 318/113 |
| 7,274,968 B1 | * | 9/2007 | Toyonaga | ............ | G05B 19/414 318/569 |
| 2002/0067318 A1 | * | 6/2002 | Matsuzaki | ............ | G06F 3/1423 345/1.1 |
| 2002/0172315 A1 | * | 11/2002 | Sullivan | .................. | H04L 25/40 375/377 |
| 2006/0093127 A1 | * | 5/2006 | Zehentner | ........ | G01R 31/31709 379/359 |
| 2008/0226009 A1 | * | 9/2008 | Moriwaki | ............. | H03L 7/0994 375/376 |
| 2010/0161711 A1 | * | 6/2010 | Makhija | .................. | G06F 9/455 709/203 |

FOREIGN PATENT DOCUMENTS

| | | |
|---|---|---|
| CN | 1293852 A | 5/2001 |
| CN | 101267292 A | 9/2008 |
| CN | 201247292 Y | 5/2009 |
| DE | 692 32 158 T2 | 7/2002 |
| DE | 10 2004 052 175 A1 | 5/2006 |
| JP | 5-066820 A | 3/1993 |

(Continued)

*Primary Examiner* — Ramesh Patel  
(74) *Attorney, Agent, or Firm* — Drinker Biddle & Reath LLP (57) ABSTRACT

In a numerical control system in which a numerical controller and an I/O unit perform serial data communication through a communication line, a counter of the I/O unit starts time measurement with an input signal from an in-machine measurement device as a trigger and stops counting at the start of transmission of DI data. The I/O unit transmits a flag indicative of input of the input signal as a trigger and a value in the stopped counter to the numerical controller. Based on a time value measured by a timer and the counter value, the numerical controller calculates the time of input of the input signal.

5 Claims, 6 Drawing Sheets

(56) References Cited

FOREIGN PATENT DOCUMENTS

| | | |
|---|---|---|
| JP | 6-149320 A | 5/1994 |
| JP | 10-124118 A | 5/1998 |
| JP | 11-205392 A | 7/1999 |
| JP | 11-272319 A | 10/1999 |
| JP | 11-345177 A | 12/1999 |
| JP | 2000-330625 A | 11/2000 |
| JP | 2003-271468 A | 9/2003 |
| JP | 2007-128413 A | 5/2007 |
| JP | 2011-216085 A | 10/2011 |

* cited by examiner

NUMERICAL CONTROL SYSTEM USING I/O UNIT FOR TIME MEASUREMENT

RELATED APPLICATION DATA

This application claims priority under 35 U.S.C. §119 and/or §365 to Japanese Application No. 2012-062101 filed Mar. 19, 2012, the entire contents of which is incorporated herein by reference.

BACKGROUND OF THE INVENTION

1. Field of the Invention

The present invention relates to a numerical control system using an I/O unit for time measurement.

2. Description of the Related Art

An in-machine measurement function of a numerically-controlled machine tool is implemented such that a touch sensor attached to the feed shaft of the machine tool is brought into contact with a measurement object by controlling the feed shaft and a signal from the touch sensor is used for measurement. According to this in-machine measurement function, the measurement object is measured in such a manner that a numerical controller notices the activation timing of the output of the touch sensor when the feed shaft is moved to bring the touch sensor into contact with the measurement object (Japanese Patent Application Laid-Open No. 5-66820). To achieve this function, the touch sensor output should be input as a DI signal to the numerical controller by some means or other.

Normally, signals of this type, as well as the signal for the touch sensor, are often input through a DI signal input interface on the numerical controller.

In order to input and output DI/DO signals (input and output signals) between the numerical controller (CNC) and the machine tool, a plurality of external signal input/output units (I/O units) are connected so that the DI/DO signals are normally transferred between the numerical controller and the I/O units. If the touch sensor output is input to the I/O units, it is possible to achieve a more flexible configuration and wiring than in the case where the DI signal is input through the interface on the numerical controller.

Since the numerical controller is expected to perform predetermined processing in a fixed time, however, the DI/DO signals are often transferred at regular intervals. If the touch sensor output is input to the numerical controller through the I/O units, in such a case, it is inevitably updated in each transfer period. Therefore, some means is needed to achieve higher-precision measurement. A technique to overcome this problem is disclosed in Japanese Patent Applications Laid-Open No. 6-149320 and No. 11-205392.

On the other hand, Japanese Patent Application Laid-Open No. 6-149320, mentioned above, discloses a technique in which I/O units perform event-driven communication with a numerical controller based on DI signal input as a trigger. According to this technique, the communication is effected interrupting periodic transfer. To achieve this, a sophisticated design, as well as a complicated arbiter circuit and priority setting, is required such that the transfer period is determined in consideration of interruption or is regularized through a special protocol or processing sequence using a timer circuit or the like, in place of fixed-period transfer.

Further, Japanese Patent Application Laid-Open No. 11-205392, mentioned above, discloses a technique in which I/O units individually comprise therein timers for time counting, which are synchronized by a communication protocol. According to this technique, the timers in the I/O units, which are strictly expected to be low in cost, are disadvantageous due to their increasing the circuit scale.

SUMMARY OF THE INVENTION

Accordingly, in order to solve the above-described problems, the object of the present invention is to provide a numerical control system capable of performing higher-precision in-machine measurement based on time measurement by an I/O unit or units.

A numerical control system according to the present invention comprises a numerical controller and one or more I/O units connected to the numerical controller and transfers input and output signals between the numerical controller and the I/O units through serial communication. In this numerical control system, each of the I/O units comprises a time measurement section configured to start time measurement with an input signal as a trigger and a serial communication section configured to transmit a flag indicative of input of the input signal and a measured value of the time measurement section at the start of sending back by the I/O unit to the numerical controller. On the other hand, the numerical controller comprises an acquisition section configured to acquire the flag and the measured value input through the serial communication, a timer configured to measure time, and an input time calculation section configured to calculate the time of input of the input signal based on the time measured by the timer and the measured value acquired by the acquisition section.

The input time calculation section may be configured to calculate the time of input of the input signal based on a delay time of communication between the numerical controller and the I/O unit, as well as on the measured time and the measured value.

The numerical controller may comprise a delay time measurement section configured to measure the delay time of communication between the numerical controller and the I/O unit through the serial communication.

In the case where the plurality of I/O units are connected in a chain to the numerical controller, the input time calculation section may be configured to calculate the time of input of the input signal based on the delay time of communication between any one of the I/O units and the I/O unit adjacent thereto, as well as on the measured time and the measured value.

The I/O unit may be configured to start sending back to the numerical controller in the serial communication on receiving data from the numerical controller.

According to the present invention, there can be provided a numerical control system capable of performing higher-precision in-machine measurement based on time measurement by an I/O unit or units.

BRIEF DESCRIPTION OF THE DRAWINGS

The above and other objects and features of the present invention will be obvious from the ensuing description of embodiments with reference to the accompanying drawings, in which.

DESCRIPTION OF THE PREFERRED EMBODIMENTS

Figure 1:
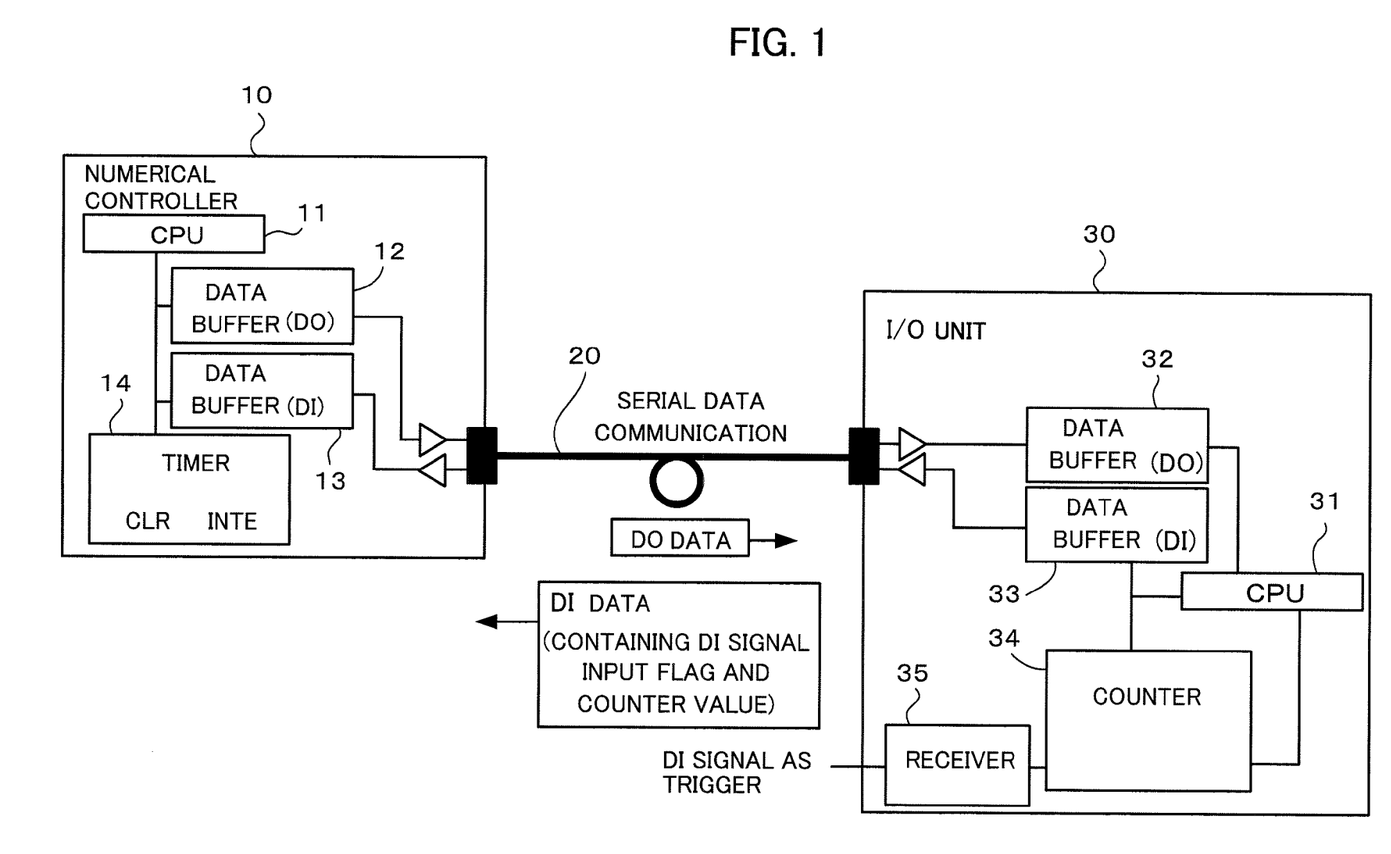
FIG. 1 is a block diagram illustrating a numerical control system according to the present invention.

As shown in FIG. 1, a numerical control system using an I/O unit for time measurement comprises a numerical controller 10, communication line 20, and I/O unit 30. The numerical control system may be a system in which a plurality of I/O units 30 are connected in the shape of a star around the numerical controller 10 or in a chain (see FIG. 6).

The numerical controller 10 comprises a processor (CPU) 11, data buffer (DO) 12, data buffer (DI) 13, timer 14, such as a real-time clock for time counting, etc. The I/O unit 30 comprises a processor (CPU) 31, data buffer (DO) 32, data buffer (DI) 33, counter 34, and receiver 35. The counter 34 starts counting on receiving a DI signal as a trigger. The numerical controller 10 and the I/O unit 30 perform serial data communication through the communication line 20. The numerical controller 10 and the I/O unit 30 periodically transfer data between them.

If the DI signal as a trigger is input from, for example, a touch sensor 40 to the I/O unit 30, the counter 34 of the I/O unit 30 starts counting. The DI signal is not limited to that from the touch sensor 40. The numerical controller 10 transmits serial data (DO data) to the I/O unit 30 through the communication line 20. On receiving the serial data (DO data) from the numerical controller 10, the I/O unit 30 sends back the serial data (DI data) to the numerical controller 10. The counter 34 stops counting at the start of sending back of the this serial data (DI data), and sends back the current value in the counter 34 and a flag indicative of the input of the DI signal as serial data (DI data) to the numerical controller 10 through the communication line 20 by serial data communication.

On the other hand, if the numerical controller 10 having received the serial data from the I/O unit 30 identifies the aforesaid flag in the DI data, an accurate time input by the DI signal as a trigger can be specified by subtracting the value in the counter 34, contained in the received DI data, and a previously measured value of communication delay time from a time value in the timer 14 of the numerical controller 10, by subtraction means.

In this numerical control system, necessary hardware (circuit) for the I/O unit 30 is not a timer for time counting but the counter 34 that measures the time duration from the input of the DI signal as a trigger to the start of sending back to the numerical controller 10. The counter 34 is only expected to be able to count the length for the period of fixed transfer between the numerical controller 10 and the I/O unit 30. Thus, a measurement system can be achieved that has a circuit scale smaller than that of a timer such as a real-time clock for time counting.

Figure 2:
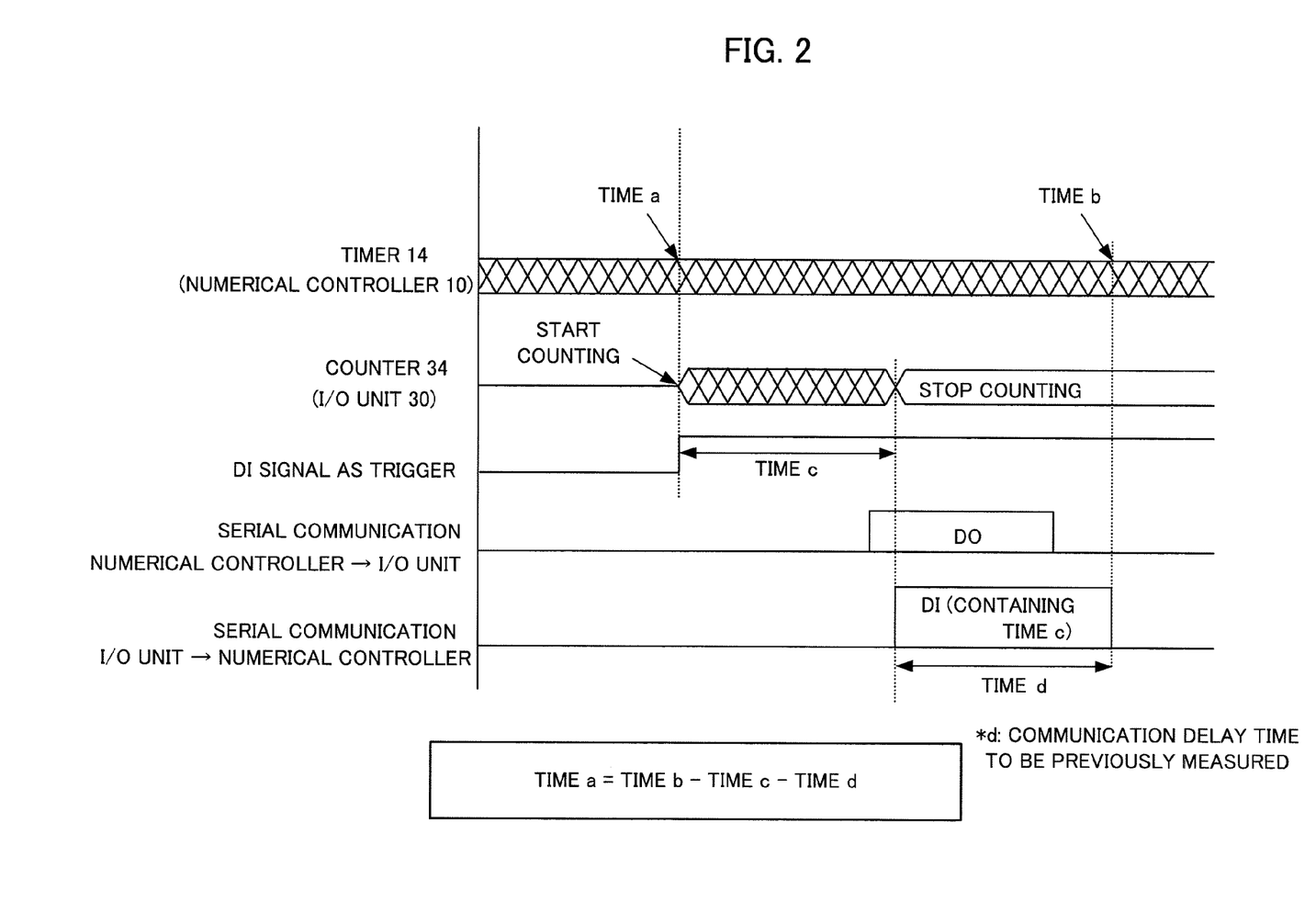
FIG. 2 is a time chart illustrating the present invention.

FIG. 2 is a time chart illustrating the operation of the numerical control system. The timer 14 of the numerical controller 10 determines the current time on a moment-by-moment basis. The counter 34 of the I/O unit 30 (or receiver 35) starts counting when the DI signal as a trigger is input to the I/O unit 30.

The numerical controller 10 periodically transmits DO data to the I/O unit 30. On receiving the DO data from the numerical controller 10, the I/O unit 30 sends back the serial data (DI data) to the numerical controller 10. The I/O unit 30 causes the counter 34 to stop counting at the start of sending back of this serial data (DI data). The current value in the counter 34 and the flag indicative of the input of the DI signal as serial data is sent back to the numerical controller 10 through the communication line 20 by serial data communication.

On receiving this serial data, on the other hand, the numerical controller 10 subtracts the value (c) in the counter 34, contained in the received DI data, and the previously measured value (d) of communication delay time from the time value (b) measured by the timer 14, by the subtraction means, thereby obtaining the time (a (=b−c−d)) of the input of the DI signal as a trigger to the I/O unit 30.

Figure 3:
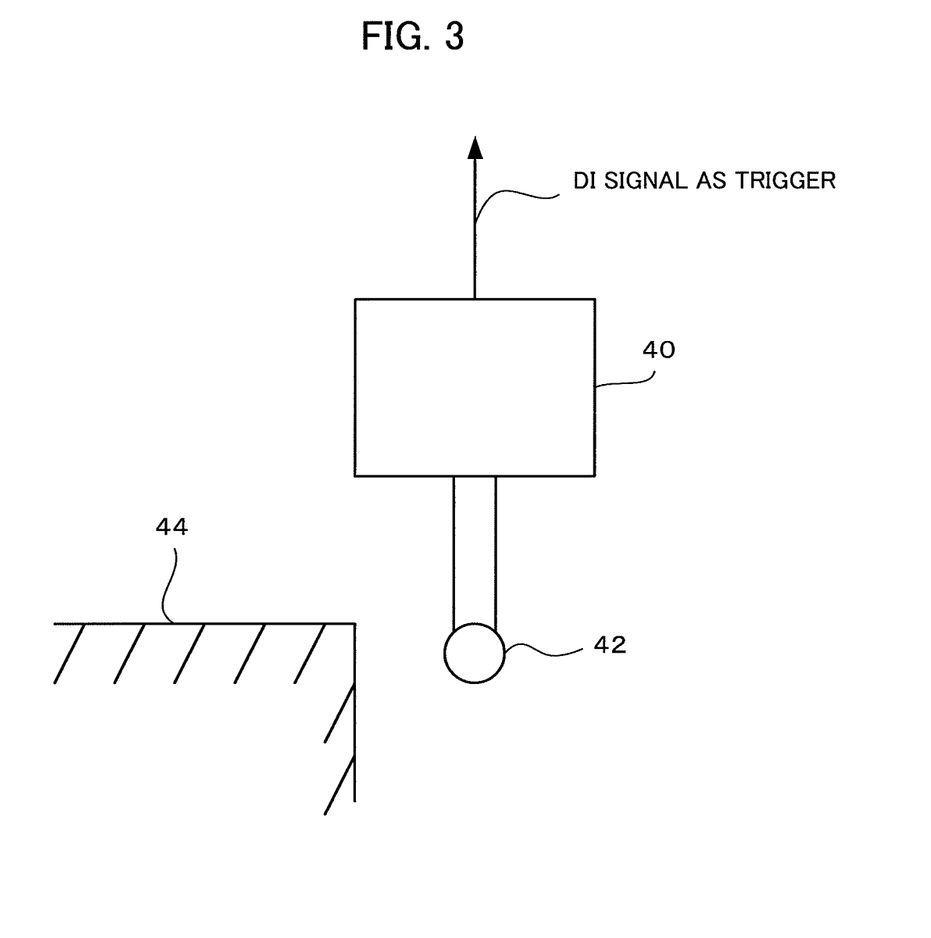
FIG. 3 is a diagram illustrating how a touch sensor contacts a workpiece and outputs a DI data as a trigger.

FIG. 3 is a diagram illustrating how the touch sensor contacts a workpiece and outputs the DI data as a trigger. An in-machine measurement may be performed by using an in-machine measurement device, such as a touch sensor, attached to a machine tool (not shown). In this case, if the touch sensor 40 is moved relative to a workpiece 44 so that the distal end portion of a contactor 42 of the touch sensor 40 contacts the workpiece 44, the DI signal as a trigger is output from the touch sensor 40. An example of the DI signal as a trigger input to the receiver 35 of the I/O unit 30 shown in FIG. 1 is a signal output from the touch sensor 40 shown in FIG. 3.

Figure 4:
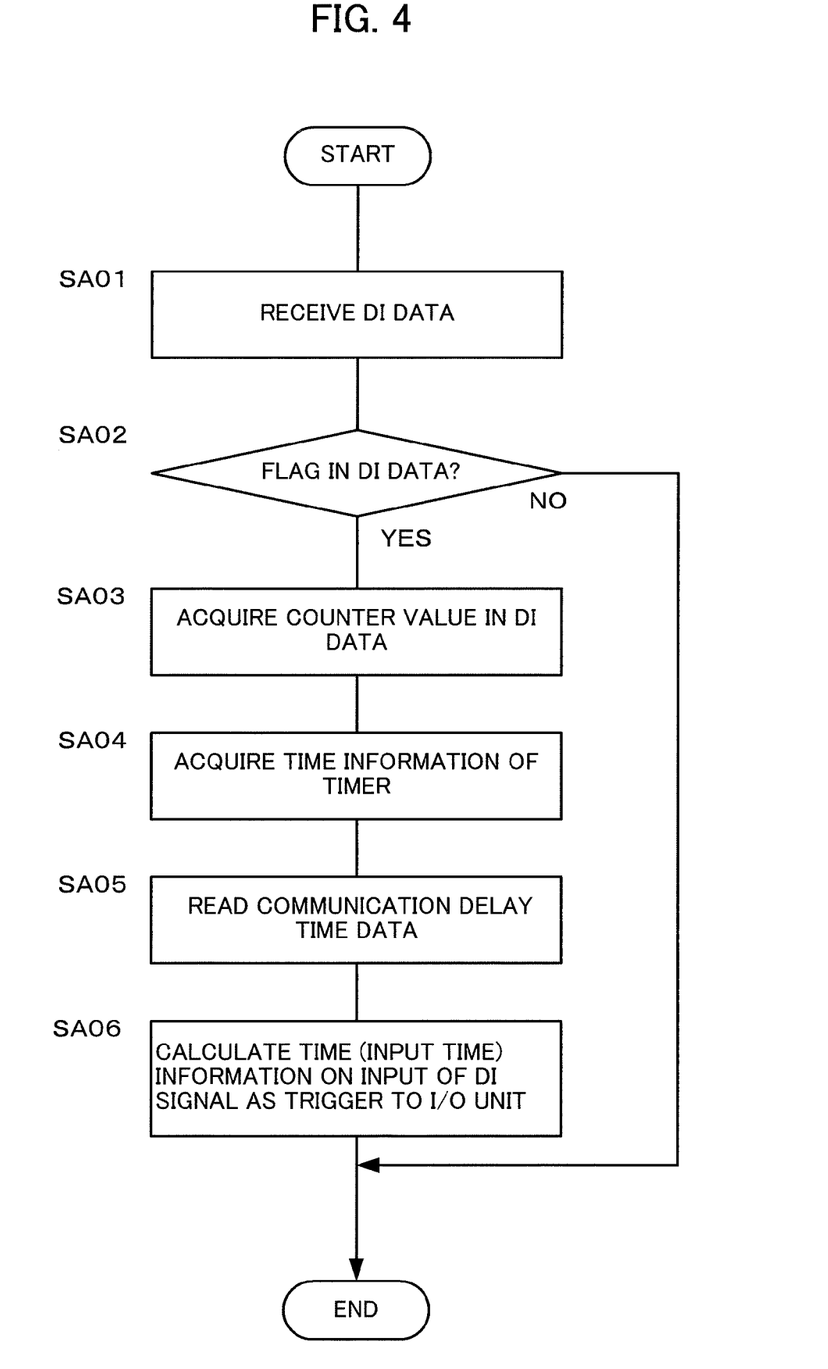
FIG. 4 is a flowchart illustrating processing on the side of the numerical control system.
Figure 5:
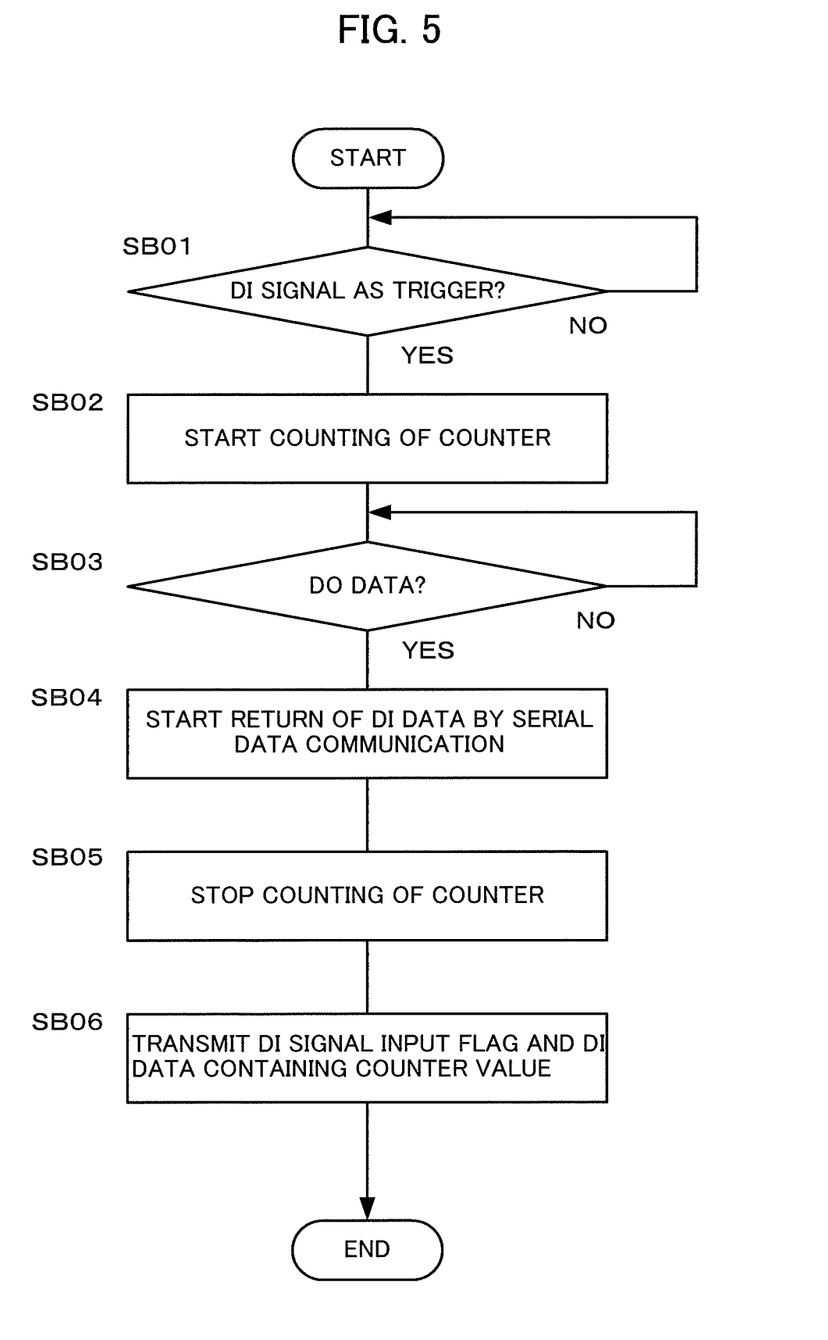
FIG. 5 is a flowchart illustrating processing on the side of an I/O unit.

Processing performed by the numerical controller and the I/O unit will now be described with reference to the flowcharts of FIGS. 4 and 5.

The processing on the side of the numerical controller will be described with reference to FIG. 4. The following is a sequential description of various steps of operation.

[Step SA01] Reception processing is performed for the DI data transmitted from the I/O unit 30.

[Step SA02] It is determined whether or not the received DI data contains the flag indicative of the input of the DI signal as a trigger. If the DI signal input flag is not contained, this processing ends. If the DI signal input flag is contained, the program proceeds to Step SA03.

[Step SA03] A counter value contained in the DI data is acquired.

[Step SA04] Time information of the timer 14 is acquired.

[Step SA05] The communication delay time data previously measured, set, and stored in a memory in the numerical controller is read.

[Step SA06] Information on the time of the input of the DI signal as a trigger to the I/O unit 30 is determined according to an equation, time a=time b−time c−time d, whereupon this processing ends. The time b is a time at which the reception of the DI signal from the I/O unit is finished and can be specified based on the time information measured by the timer 14. The time c is the counter value. The time d is the communication delay time that contains the length (time duration) of the DI signal transmitted from the I/O unit to the numerical controller.

The processing of Steps SA01 to SA03 corresponds to a "acquisition section" of the numerical control system according to the present invention, while the processing of Step SA06 corresponds to an "input time calculation section" of the numerical control system.

The processing on the side of the I/O unit will now be described with reference to FIG. 5. The following is a sequential description of various steps of operation.

[Step SB01] It is determined whether or not the DI signal as a trigger is input to the I/O unit 30. If the input is ascertained, the program proceeds to Step SB02. If not, input of a signal as a trigger is awaited.

[Step SB02] Counting of the counter 34 is started.

[Step SB03] It is determined whether or not the DO signal is transmitted from the numerical controller 10. If the DO signal is determined to be transmitted, the program proceeds to Step SB04. If not, transmission of the DO signal is awaited.

[Step SB04] Sending back of the DI data by serial data communication is started.

[Step SB05] The counting of the counter 34 is stopped.

[Step SB06] The DI signal input flag, indicative of the input of the DI signal as a trigger to the I/O unit 30, and the DI data containing data on the value in the counter 34 are transmitted to the numerical controller 10, whereupon this processing ends.

The processing of Step SB06 corresponds to a "serial communication section" of the numerical control system according to the present invention, while the processing of Step SB03 corresponds to "receiving data from the numerical controller" of the numerical control system of the invention.

Figure 6:
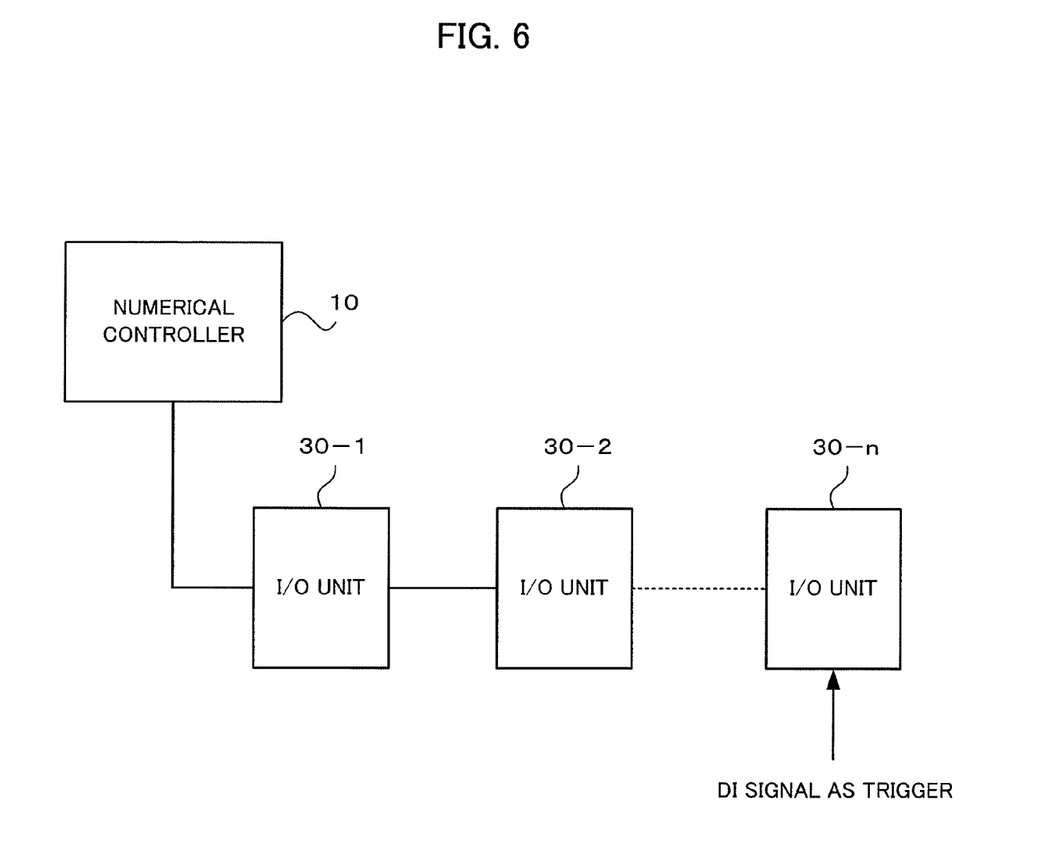
FIG. 6 is a diagram illustrating a numerical control system in which a plurality of I/O unit are connected in a daisy chain to a numerical controller.

FIG. 6 is a diagram illustrating a numerical control system in which a plurality of I/O units are connected in a chain to a numerical controller. Serial data communication is also performed between any two adjacent I/O units. The numerical control system of FIG. 6 in which the I/O units are used for time measurement should be designed in consideration of the time of communication delay between the I/O units 30, as well as that between the numerical controller 10 and the I/O units 30. To attain this, the time delay of communication from the I/O unit 30 to which a DI signal as a trigger is input to the numerical controller 10 through the other I/O units is previously measured and stored in a memory in the numerical controller. The communication time delay can be determined by, for example, outputting a dummy signal from the numerical controller 10 to the I/O units 30, sending back the dummy signal from the I/O units 30 to the numerical controller 10, and measuring the time required for sending back the dummy signal.

The invention claimed is:

1. A numerical control system, which comprises a numerical controller and one or more I/O units connected to the numerical controller and transfers input and output signals between the numerical controller and the I/O units through serial communication,
wherein the I/O unit starts sending back to the numerical controller in the serial communication on receiving data from the numerical controller, and
each of the I/O units comprising:
a time measurement section configured to start time measurement with an input signal as a trigger; and
a serial communication section configured to transmit a flag indicative of input of the input signal and a measured value of the time measurement section at the start of sending back by the I/O unit to the numerical controller,
the numerical controller comprising:
an acquisition section configured to acquire the flag and the measured value input through the serial communication;
a timer configured to measure time; and
an input time calculation section configured to calculate the time of input of the input signal based on the time measured by the timer and the measured value acquired by the acquisition section.

2. The numerical control system according to claim 1, wherein the input time calculation section calculates the time of input of the input signal based on a delay time of communication between the numerical controller and the I/O unit, as well as on the measured time and the measured value.

3. The numerical control system according to claim 2, wherein the numerical controller comprises a delay time measurement section configured to measure the delay time of communication between the numerical controller and the I/O unit through the serial communication.

4. The numerical control system according to claim 2, wherein the plurality of I/O units are connected in a chain to the numerical controller, and the input time calculation section calculates the time of input of the input signal based on the delay time of communication between any one of the I/O units and the I/O unit adjacent thereto, as well as on the measured time and the measured value.

5. The numerical control system according to claim 3, wherein the plurality of I/O units are connected in a chain to the numerical controller, and the input time calculation section calculates the time of input of the input signal based on the delay time of communication between any one of the I/O units and the I/O unit adjacent thereto, as well as on the measured time and the measured value.

* * * * *